United States Patent [19]

Hammond, Jr. et al.

[11] 4,390,355
[45] Jun. 28, 1983

[54] WALL-FLOW MONOLITH FILTER

[75] Inventors: Dean C. Hammond, Jr., Birmingham; Paul T. Vickers, Bloomfield Hills, both of Mich.

[73] Assignee: General Motors Corporation, Detroit, Mich.

[21] Appl. No.: 345,005

[22] Filed: Feb. 2, 1982

[51] Int. Cl.³ .................. B01D 39/20; C04B 21/06
[52] U.S. Cl. .................................. 55/523; 55/524; 55/DIG. 30; 210/510
[58] Field of Search .............. 55/523, 524, DIG. 30; 210/505, 508, 509, 510; 422/180, 222; 428/116, 117; 252/477 R; 60/311

[56] References Cited

U.S. PATENT DOCUMENTS

| 4,072,007 | 2/1978 | Sanday | 428/116 |
| 4,251,239 | 2/1981 | Clyde et al. | 210/505 |
| 4,276,071 | 6/1981 | Outland | 55/DIG. 30 |
| 4,283,207 | 8/1981 | Martyniuk | 55/523 |
| 4,329,162 | 5/1982 | Pitcher, Jr. | 55/DIG. 30 |

OTHER PUBLICATIONS

London, A. L., et al., Oblique Flow Headers for Heat Exchangers-The Ideal Geometries and the Evacuation of Losses, Technical Report No. 63, Aug. 1966.

Primary Examiner—David L. Lacey
Attorney, Agent, or Firm—Arthur N. Krein

[57] ABSTRACT

A diesel particulate trap comprising a ceramic monolith filter having inlet channels of decreasing cross-sectional flow area and increasing wall thickness relative to the distance from the inlet end to the outlet end of the filter.

2 Claims, 4 Drawing Figures

WALL-FLOW MONOLITH FILTER

This invention relates to exhaust particulate filters for use in the exhaust systems of diesel engines and the like and, in particular, to a ceramic wall-flow monolithic filter and to a method of making the same.

BACKGROUND OF THE INVENTION

Considerable interest has recently been focused on the problem of limiting the mass of particulate matter emitted with the exhaust gases from diesel and other internal combustion engines. In the case of diesel engines, a great deal of effort is currently being expended to develop practical and efficient devices and method for reducing emission of particulates in exhaust gases.

One method for accomplishing this is to provide a suitable particulate trap in the exhaust system of a diesel engine, the trap having at least one filter positioned therein which is capable of efficiently trapping the particulates from the exhaust gases and also being adapted to be regenerated as by the in-place incineration of the trapped particulates.

A ceramic wall-flow monolith particulate filter of the type disclosed, for example, in U.S. Pat. No. 4,276,071 entitled "Ceramic Filters For Diesel Exhaust Particulates", issued June 30, 1981 to Robert J. Outland, has emerged as a preferred form of such a filter device.

Such a ceramic wall-flow monolith particulate filter includes an outer wall interconnected by a large number of interlaced thin porous internal walls which define a honeycomb structure to provide parallel channels running the length thereof. Alternate cell channel openings on the monolith face are blocked and, at the opposite end the alternate channel openings are blocked in a similar manner but displaced by one cell whereby to define inlet channels and outlet channels.

With this filter arrangement, the exhaust gas cannot flow directly through a given inlet channel but is forced to flow through the separating porous walls into an adjacent outlet channel. The exhaust gas is thus filtered as it flows through the porous walls between adjacent channels.

As this type ceramic filter is presently manufactured, the ceramic walls thereof are fabricated by extrusion and then fired. After firing, the alternate channel openings are plugged in a suitable manner to provide the structure described hereinabove having a plurality of inlet channels and a plurality of outlet channels arranged in checkerboard fashion.

Because of this above-described method of construction of such a ceramic filter device, all known filter structures of the above-described type have the channels thereof of uniform cross-section throughout the longitudinal length of the filter element.

In operation, this type of filter device is situated in the engine exhaust system and removes particulates from the exhaust gases by trapping of the particulates on the walls of the inlet passages or channels separating them from the outlet channels. As will be apparent however, packaging considerations for the use of such a filter in a vehicle application restrict the size of such a filter device thus limiting its particulate storage capacity. Therefore, as used in a vehicle emission system, the accumulated soot must periodically be oxidized, as by incineration, to effect regeneration of the filter device.

However, during the incineration of accumulated particulates on a filter, the uncontrolled burning thereof can result in excessively high temperatures. Such high temperatures, if not evenly distributed throughout the body of the filter, can result in thermal gradients which may cause mechanical failure of the filter structure or, even worse, such high temperatures may actually exceed the melting temperature of the material used to fabricate the filter.

It has now been discovered that due to the parallel flow of exhaust gases through a uniformly porous wall with constant-area inlet and outlet channels, the axial distribution of particulate loading is in fact not uniform and will, in effect, be identical to that of the transverse velocity of the exhaust gas flowing through the porous wall. This is due to the fact that diesel exhaust particulates are sufficiently small to follow the exhaust gas flow almost exactly, and therefore, the axial distribution of particulate loading will be identical to that of the transverse velocity, that is, increasingly heavy towards the downstream end of the inlet channels.

SUMMARY OF THE INVENTION

The present invention relates to an improved cellular, ceramic monolith diesel particulate filter and, to a method of making the same, the filter having inlet channels therein of increasing wall thickness and decreasing flow area with X/L wherein: X is the distance from the inlet face of an inlet channel; and, L is the total length of an inlet channel.

It is therefore a primary object of this invention to provide an improved wall flow monolith diesel particulate filter having a plurality of inlet channels and outlet channels separated by porous walls, with the walls being of increasing thickness along the length of the inlet channel from the inlet face thereof and with the cross-sectional flow-area of each inlet channel decreasing with its distance from the inlet face of the inlet channels whereby to provide for uniform particulate trapping.

Another object of this invention is to provide a method for making a monolith diesel particulate filter wherein an otherwise conventional filter trap, having uniform constant-area inlet and outlet channels, is positioned whereby a stream consisting of ceramic powder dispersed in a carrier fluid is passed through the filter via the inlet channels to the outlet channels, the ceramic powder accumulating along the inlet channel walls according to the axial distribution of the transverse velocity of the carrier fluid to thereby increase the wall thickness and decrease the inlet channel area with increasing distance from the inlet face of the inlet channels, removing the thus coated filter from the stream after a predetermined time and then firing the filter so as to fuse the ceramic powder as deposited whereby to produce a filter element with more uniform particulate trapping characteristics.

For a better understanding of the invention, as well as other objects and features thereof, reference is had to the following detailed description of the invention to be read in connection with the accompanying drawings.

BEST MODE FOR CARRYING OUT THE INVENTION

Figure 1:
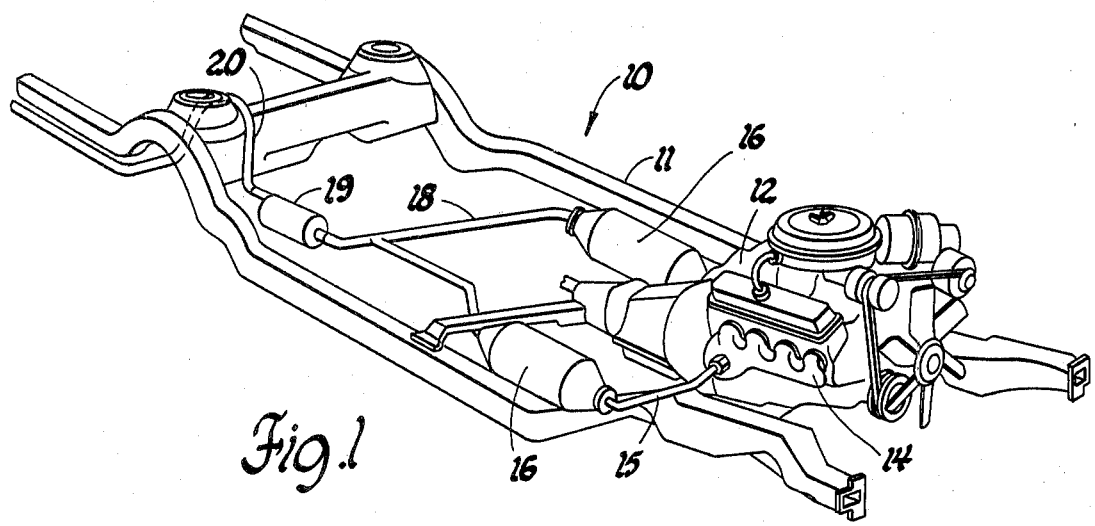
FIG. 1 is a pictorial view of a partial vehicle chassis including a diesel engine with an exhaust system equipped with a pair of exhaust particulate traps.

Referring first to FIG. 1, numeral 10 generally indicates a vehicle chassis, portions of which have been omitted from the drawing for clarity. The chassis 10 includes a vehicle frame 11 on which is mounted a V-type diesel engine 12. Engine 12 includes a pair of cylinder banks each mounting an exhaust manifold 14 connected in an engine exhaust system, the right hand manifold being the only one visible in the figure.

Each exhaust manifold connects through a suitable exhaust pipe 15 with an exhaust emission control system which includes an exhaust particulate trap 16 suitably supported in the vehicle frame by means not shown and adapted to collect particulates in the exhaust gases delivered to the traps from the cylinders of the respective cylinder banks. The outlets of the traps 16 are connected through a wye pipe 18 with a muffler 19, which in turn connects through a tailpipe 20 with the rear of the vehicle for passing the exhaust gases to atmosphere.

Each of the particulate traps 16 includes a housing which may be of any form of construction and configuration suitable for the purpose. Within the housing, there is disposed an incineration cleanable ceramic filter element which may be of the type disclosed in the above-identified U.S. Pat. No. 4,276,071 and which may have any of a number of possible configurations such as, for example, that of the element illustrated in FIG. 2 and generally indicated by numeral 22. Preferably and as well known in the art, the emission control system also includes suitable heater means, such as electrical heater means or fuel burner means, not shown, to supply necessary heat to effect incineration of particulates previously trapped by the filters to effect regeneration thereof.

Figure 2:
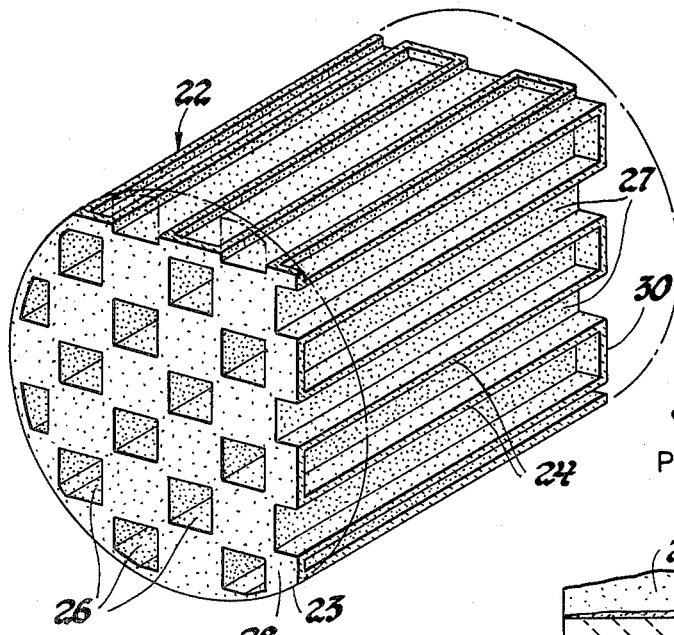
FIG. 2 is a sectional pictorial view showing the construction of a conventional monolithic ceramic filter used in the particulate traps in the structure of FIG. 1.

Filter element 22 shown in FIG. 2 is in the form of a ceramic monolith having a surrounding cylindrical outer wall 23 internally interconnected by a large number of interlaced thin porous internal walls 24. The interlaced walls define internally thereof two groups of parallel passages or channels including respectively inlet channels 26 and outlet channels 27, each extending to opposite ends of the element 22. The inlet channels 26 are open at the inlet end 28 of the element and are closed at the outlet end 30 of the element, while the outlet channels 27 are closed at the element inlet end 28 and open at the outlet end 30.

Figure 3:
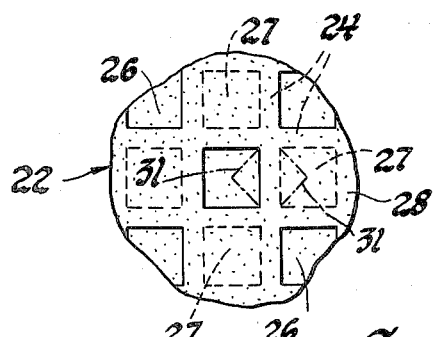
FIG. 3 is a pictorial view of a portion of the inlet face of the filter of FIG. 2; and, FIG. 4 is a pictorial sectional view of a portion of a filter of the type shown in FIGS. 2 and 3 but with the inlet channel thereof a configuration and which is formed in accordance with the subject invention.

In the FIG. 2 embodiment, the channels are of square cross-section as best seen in FIG. 3, although, as disclosed in the above-identified U.S. Pat. No. 4,276,071, numerous other configurations could be utilized. Further, the inlet and outlet channels are arranged in vertical and horizontal rows (as viewed in cross-section), as shown in FIG. 3, with the inlet channels 26 alternating with exhaust channels 27 in a checkerboard pattern. Thus, it will be appreciated that each interior wall portion of the element lies between an inlet channel and an outlet channel at every point of its surface except where it engages another wall, as it does at the corners of the channels. So, except for the corner engagement, the inlet channels 26 are spaced from one another by intervening outlet channels 27 and vice versa.

The construction of the ceramic monolith is such that the interior walls 24 are porous so as to permit passage of exhaust gases through the walls from the inlet to the outlet channels. The porosity of the walls is sized appropriately to filter out a substantial portion of the particulates present in diesel exhaust gases. At present, tests have indicated that efficient filtration is provided by a ceramic wall structure having an average porosity of about 10 percent, a mean pore size of from about 2 to 15 microns in a range or pore sizes of from about 0.5 microns to about 70 microns. This has been accomplished in a monolith structure having square passages measuring on the average about 0.06 inches on a side with a wall thickness of about 0.015 inches between passages. Recognizing that the inlet channel sides of the entire internal wall structure between inlet and outlet channels represent active filtering area, it is apparent that this structure provides more than 20 square inches of filter wall area for each cubic inch of the monolithic filter structure. Thus, a filter having very low restriction with a large amount of filter area in a very small package is provided.

In the operation of the filter 22 of FIG. 2, the axial distribution of particulates along a given inlet channel 26 is controlled by the gas flow within the monolith filter. As shown schematically by the broken lines 31 in FIG. 3, a constant-area triangular sector of an inlet channel 26 communicates with an identical sector of an adjacent outlet channel 27, the flow through only one wall 24 being illustrated in this Figure. The gas flow through this type known filter structure is thus completely defined by the solution for parallel-flow through a uniformly-porous wall with constant-area inlet and outlet channels as described, for example, in the publication by A. L. London, G. Klopfer and S. Wolf, entitled "Oblique Flow Headers for Heat Exchangers—Ideal Geometries and the Evaluation of Losses", Department of Mechanical Engineering, Stanford University, Technical Report No. 63, August 1966. This publication has also disclosed the required variation of inlet channel area to produce uniform wall flow with a constant-area outlet channel.

It thus appears that three posibilities are suggested for homogenizing the axial distribution of particulate loading:

1. Decreasing the wall porosity with X/L.
2. Increasing the wall thickness with X/L.
3. Decreasing the inlet channel flow-area with X/L wherein:

X is the distance from the inlet face of an inlet channel; and,

L is the total length of an inlet channel.

Unfortunately, with the known method of making such monolithic structures of the type exemplified by the filter 22 structure described, the above suggested possibilities would be extremely difficult to implement individually.

Now in accordance with the invention, Applicants have devised a technique which, in effect, combines the last two possibilities to produce a substantially uniform-flow monolithic filter structure, in a manner to be described in detail next hereinafter.

A monolith filter, in accordance with the invention, is provided with inlet channels each having decreasing flow-area with X/L, constant-area outlet channels and, with the porous walls therebetween of increasing wall thickness with X/L, the increasing thickness being effected on the inlet channel side of the porous walls.

Referring now to the method of fabrication of the wall-flow monolith particulate filter in accordance with the invention, a stream consisting of a suspension of ceramic powder 40 dispersed in a carrier fluid, such as clean water, is passed through a conventional ceramic monolith filter 22, of the type shown in FIG. 2, having originally constant-area inlet channels 26 and constant-area outlet channels 27. As the carrier fluid flows into the inlet channels and then through the separating porous walls into the outlet channels for discharge therefrom, the transverse velocity thereof through the porous walls is, initially, increasing with its flow distance from the inlet end or face of the respective inlet channel.

Figure 4:
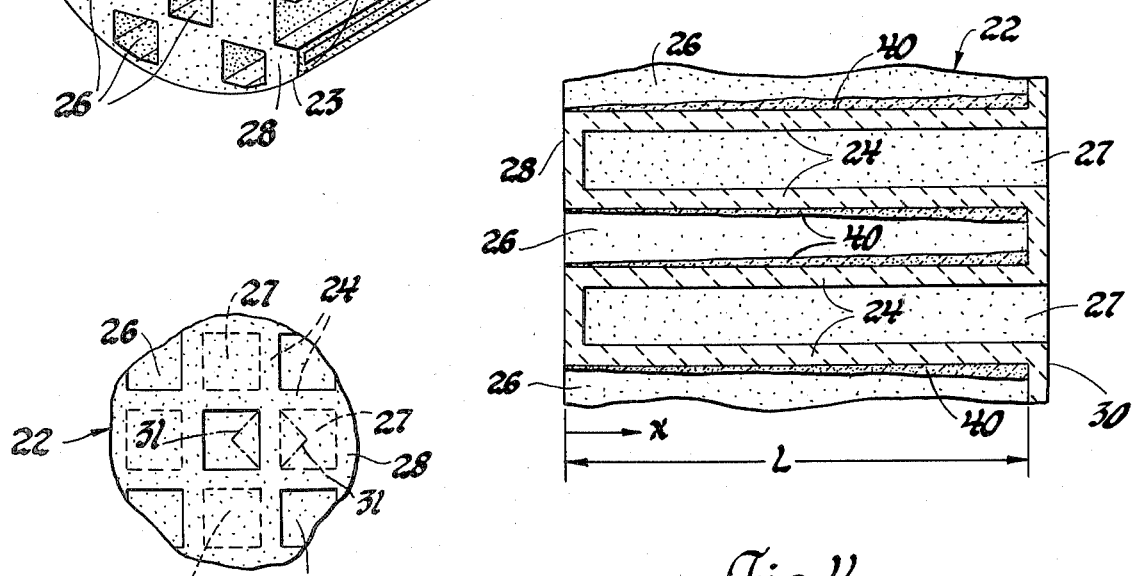

Accordingly, the ceramic powder 40 carried by the carrier fluid will be filtered out from the carrier fluid by the porous walls and this ceramic powder will accumulate along the inlet channel walls according to the axial distribution of transverse velocity. This deposition of ceramic powder 40 will be effective to both increase the wall thickness and to decrease the inlet channel area with increasing X/L. For purposes of illustration, the ceramic powder 40 is schematically shown on two opposed wall 24 sides only in the inlet channels 26 in FIG. 4. As illustrated in FIG. 4, the ceramic powder 40 as deposited by being trapped on the inlet channel surface of the porous walls 24 changes the configuration of the walls so that each of the wall surfaces defining an inlet channel is inclined toward the nominal axis of the channel, that is, inclined upward from the inlet end 28 to the outlet end 30 toward this axis.

After a predetermined amount of ceramic powder 40 has thus been deposited on the inlet channel walls, the monolith filter with the ceramic powder deposited on the walls of the inlet channels is removed from the stream and then it is fired to fix the ceramic powder to the inlet channel walls. The ceramic powder as thus trapped by the porous walls and then fired in place become, in effect, an integral part of such porous walls 24.

The approximate effect of this deposition process of ceramic powder on inlet channel area and wall thickness for a particular embodiment is schematically shown in FIG. 4, which also shows the notations X and L used herein, and is summarized in the following Table.

TABLE

Approximate Inlet Channel Modifications Achievable with Deposition All Quantities Normalized on the Value at Entrance to Inlet Channel

| X/L | Transverse Velocity | "Ideal" Area for Uniform Transverse Velocity | After Deposition and Firing of Ceramic Powder | |
|---|---|---|---|---|
| | | | Incremental Wall Thickness | Channel Area |
| 0 | 1.00 | 1.00 | 0.39 | 1.00 |
| ¼ | 1.33 | 0.74 | 0.52 | 0.79 |
| ½ | 1.58 | 0.47 | 0.61 | 0.63 |
| ¾ | 2.00 | 0.22 | 0.78 | 0.37 |
| 1 | 2.58 | 0 | 1.00 | 0 |

From the above Table, it will be apparent that using 1 as the base unit for the respective exhaust gas or carrier fluid transverse velocity measurement at the inlet end of the inlet channel, it will be apparent that the transverse velocity increases by the factors shown as the distance from the inlet end of the inlet channel increases. In a similar manner, in the column related to "Ideal" cross-sectional area for uniform transverse velocity, the unit 1 represents a given cross-sectional area at the inlet end of the inlet channel with the actual cross-sectional area ideally decreasing by the fraction units shown as the fraction of the total distance from the inlet end increases.

As shown by the last column in the Table, the reduction in the inlet channel area, as a result of ceramic powder disposition, is less than the ideal shown in the second column, but this variation between actual and ideal cross-sectional areas is compensated for by an actual increase in wall thickness so that the resulting inlet channel configuration and wall thickness will provide for a relatively uniform axial particulate trapping distribution when the filter of the invention is used on a diesel engine emission control system.

In carrying out the method of the invention, a ceramic wall-flow monolith filter 22 such as shown in FIG. 2 would be supported in a suitable housing similar to that of the particulate traps 16 shown in FIG. 1, with the stream of the ceramic powder and carrier fluid supplied to it by a suitable supply conduit, not shown, which may be a conduit similar to the exhaust pipe 15 suitably connected to a trap. The outlet of the trap housing would be connected by a similar conduit to a suitable reservois, not shown, for containing the carrier fluid at atmospheric pressure, via, preferably, a conventional, commercially available filter system, not shown, of the type suitable for removing any small dust particles that may remain in the carrier fluid after its passage through the filter.

It will now be apparent that the amount of ceramic powder 40 which is added to a particular monolith filter 22 in order to substantially homogenize the flow through the walls 24 to obtain substantially uniform particulate trapping can be predetermined, for example, experimentally by fabricating and testing the particulate filters with different quantities of ceramic powder added in the manner described hereinabove. After the required amount of ceramic powder 40 for a particular basic filter structure has been determined, the ceramic powder 40 addition can be controlled either by adding this quantity of ceramic powder to a carrier fluid and flowing this stream until all of the powder has been added and delivered to the monolith filter or by controlling the time during which a uniform aqueous ceramic powder dispersion is flowed through the monolith filter.

The ceramic powder 40 is preferably composed of the same material as that used in the fabrication of the monolithic structure of the filter 22 and is preferably of the type disclosed in U.S. Pat. No. 3,954,672 entitled Cordierite Refractory Compositions and Method of Forming Same issued May 4, 1976 to Arthur V. Somers, Morris Berg and Archie A. Shukle, the disclosure of which is incorporated herein by reference thereto. Accordingly, the ceramic powder can be fired in the same manner as disclosed in this patent.

The embodiments of the invention in which an exclusive property or privilege is claimed are defined as follows:

1. A wall-flow diesel pariculate filter for use in a diesel engine exhaust system, said filter comprising a ceramic monolith having a plurality of interiaced thin gas filtering porous internal walls defining a plurality of parallel aligned passages extending from an inlet end to an outlet end of the filter, said passages including a first group comprising inlet passages open at said inlet end and closed at said outlet end and a second group comprising outlet passages closed at said inlet end and open at said outlet end, the cross-sectional flow area of each said inlet passage substantially decreasing and the walls defining said inlet passage substantially increasing in thickness along its longitudinal length from said inlet end to said outlet end for the more uniform trapping of particulates on these walls during exhaust gas flow into said inlet passages and through said walls into associated, adjacent said outlet passages and the cross-sectional flow area of said outlet passages remaining constant.

2. A wall-flow diesel particulate filter element for use in a diesel engine exhaust system, said filter element comprising a ceramic monolith having a plurality of interlaced thin gas filtering porous internal walls defining a plurality of substantially parallel aligned passages extending from an inlet end to an outlet end of said filter element, said passages including a first group of spaced apart inlet passages open at said inlet end and closed at said outlet end and a second group of outlet passages closed at said inlet end and open at said outlet end and located next adjacent to associated said inlet passages, the said walls defining said inlet passages on the inlet passage side thereof being of increased internal wall thickness and being inclined in the direction from said inlet end to said outlet end toward a central axis of a said inlet passage and the cross-sectional flow area of said outlet passages remaining constant whereby the cross-sectional flow area through a said inlet passage decreases from said inlet end to said outlet end of the filter element.

* * * * *